(12) United States Patent
Wolfson

(10) Patent No.: US 7,258,280 B2
(45) Date of Patent: Aug. 21, 2007

(54) DAMPER CONTROL IN SPACE HEATING AND COOLING

(75) Inventor: Jason Wolfson, Duxbury, MA (US)

(73) Assignee: Tuckernuck Technologies LLC, Duxbury, MA (US)

( * ) Notice: Subject to any disclaimer, the term of this patent is extended or adjusted under 35 U.S.C. 154(b) by 314 days.

(21) Appl. No.: 10/823,839

(22) Filed: Apr. 13, 2004

(65) Prior Publication Data

US 2005/0224591 A1 Oct. 13, 2005

(51) Int. Cl.
*F24F 7/00* (2006.01)
*F24F 11/04* (2006.01)
*B08B 15/02* (2006.01)

(52) U.S. Cl. .................... 236/49.3; 165/244; 454/256; 454/61

(58) Field of Classification Search ............... 236/49.3, 236/44 A, 44 C; 165/244, 223; 62/231; 454/61, 256
See application file for complete search history.

(56) References Cited

U.S. PATENT DOCUMENTS

| | | | |
|---|---|---|---|
| 2,224,946 A | | 12/1940 | Appel |
| 4,136,730 A | | 1/1979 | Kinsey |
| 4,437,608 A | * | 3/1984 | Smith .......................... 236/13 |
| 5,230,466 A | * | 7/1993 | Moriya et al. ............ 236/44 A |
| 5,544,645 A | | 8/1996 | Armijo et al. |
| 5,547,017 A | | 8/1996 | Rudd |
| 5,582,233 A | | 12/1996 | Noto |
| 5,881,806 A | | 3/1999 | Rudd |
| 6,431,268 B1 | * | 8/2002 | Rudd ........................ 165/223 |
| 6,860,430 B2 | | 3/2005 | Sanchez |
| 6,988,671 B2 | | 1/2006 | DeLuca |
| 7,044,397 B2 | | 5/2006 | Bartlett |
| 2005/0156051 A1 | | 7/2005 | Sanchez |

FOREIGN PATENT DOCUMENTS

| | | | |
|---|---|---|---|
| CA | 2245135 | | 8/2001 |
| JP | 07332737 A | * | 12/1995 |
| WO | WO 2005/100870 A2 | | 10/2005 |

OTHER PUBLICATIONS

Graves, Sheri. "Clean air products boost SR business sales," http://www.pressdemocrat.com/outlook02/news/090profair_o15.html, Jun. 9, 2002.
"IAQ Enforcer Product Data," Sensor Signal Processors, (1998). http://www.ebtron.com/pdf/data_sheets/iaq_enforcer/IAQ%20Data.pdf.
Federspiel Controls (1999-2004). http://www.federalspielcontrols.com/.
"Increase your comfort . . .," Trane (2004). http://www.trane.com/commercial/equipment/clch-s-26-04.asp.
Snapshot Instructions, Building Science Corporation. http://www.buildingscience.com/buildingamerica/snapshot_instructions.pdf.
St-Denis, Max. "Measuring Outdoor Air: What Works?" (1999) http://cetc-varennes.nrcan,gc.ca/eng/publication/1999-57e.pdf.

* cited by examiner

*Primary Examiner*—Chen Wen Jiang
(74) *Attorney, Agent, or Firm*—Fish & Richardson P.C.

(57) ABSTRACT

An amount of time that air has been delivered from an air handler to a space is tracked, and based on the tracked amount of time, at least one turn-on time or one turn-off time of the delivery of air from the air handler to the space is controlled. Other features relate, among other things, to controlling a replacement air vent, and to user interfaces.

21 Claims, 14 Drawing Sheets

Desired fan duty cycle = 33%
Desired period = 30 Minutes

Example: Fan on = 10 minutes
Fan off = 20 minutes

No call for heating or cooling    Fan is on for 10 minutes per 1/2 hour, no error.

402  404                   406
1 hour ◄—10 On—►◄———20 Off———►◄—10 On—►◄———20 Off———►

Example: Air-conditioning is on.
There is a 4 minute call
for cooling then another
call for cooling after 16 minutes Total run time was 8 minutes
first half hour, 4 minutes second half
hour or an average of 12 minutes/hour.
Error = 40%

408  410  412
1 hour ◄—4 Cool—►◄—16 Off—►◄—4 Cool—►◄—16 Off—►◄—4 Cool—►◄—16 Off—►

20 Minutes off time is never met to force fan on, short on time was not taken into account

FIG. 12

Fan period = 30 Minutes
Fan min run time = 10 Minutes
Same target as example 1.

Desired fan duty cycle = 33%
Desired period = 30 Minutes

Same example: Air-conditioning is on. There is a 4 minute call for cooling then another call for cooling after 16 minutes.

Total run time was 10 minutes/half hour or 33% duty cycle.
Error rate = 0%

420 — 4 cool — 16 off — 424 — 4 cool — 4 off — 428 — 2 on — 430 — 10 off — 432 — 4 cool — 10 off — 6 on 1 hour 6 Minutes fan run time remaining. If no more fan, start fan 6 minutes before end of half hour 2 Minutes remaining. Now start fan 2 minutes before end of half hour.

Fan is forced on to finish min run time within fan period.

End of fan period, cycle starts over.

FIG. 13

DAMPER CONTROL IN SPACE HEATING AND COOLING

BACKGROUND

This description relates to damper control in space heating and cooling.

During the 1990s, the United States Department of Energy sponsored research on how to save energy in heating and cooling houses and other buildings. As shown in FIG. 1, one recommendation that has begun to be widely adopted is to super-insulate buildings, seal them tightly against air infiltration, and use a vent 10 from the outside world 12 to let in fresh air. The fresh air is needed to clear odors and humidity from the tightly sealed spaces 14 that are occupied within the buildings. The energy savings produced by such a system are so large that it is expected that, in the future, most new buildings will be super-insulated and tightly sealed.

As is typical of forced air heating or cooling systems, the heater or cooler 16, 18 (and a central fan 20) is turned on and off in response to a thermostat and controller 22 based on a comparison of a set point temperature and a current air temperature measured at a temperature sensor 24. The central fan 20 forces air from the heater or cooler through ducts 26 into the occupied spaces 14. Stale air is withdrawn from the spaces through return ducts 27 and returned to the intake side of the air handler. While the heater or cooler is running, the stale returned air is supplemented with fresh air that is drawn into the building through the vent 10. A damper 28 inside vent 10 is set in a fixed position to permit no more than a suitable amount of fresh air to be drawn in while the heater or cooler is running.

Even during intervals when the heater or cooler is not running, fresh air continues to be needed, and for this purpose, the central fan may be run from time to time during those intervals.

Heating and cooling systems are generally sized so that they run almost full-time during the coldest or warmest months. When a system that draws in fresh air from the outside world runs all the time, more air is drawn in than is needed for air exchange purposes, and energy is wasted in heating or cooling it. By motorizing the damper 28, it is possible to open and close the damper in cycles to reduce the amount of fresh air drawn into the building. In some systems, a user can specify the proportion of time that the damper is opened to permit fresh air to be drawn in. A replaceable filter 29 is included in the vent to filter the incoming air.

The cooler and/or heater are part of what is often called an air handler 32, which may also include a humidifier and/or a dehumidifier 34, and a variety of other equipment. A variety of configurations are used for air handlers, the equipment that is in them, and the equipment to which they are connected.

The air in the air handler can be heated and/or cooled in a variety of ways. A typical cooler includes the heat exchanger 18, a compressor 36 located outside the building, a delivery conduit 38 with a pump 40 to force coolant from the compressor to the exchanger and a return conduit 42 to carry used coolant back to the compressor. The pump is controlled by the controller 22.

SUMMARY

In general, in one aspect, the invention features tracking an amount of time that air has been delivered from an air handler to a space, and based on the tracked amount of time, controlling at least one turn-on time or one turn-off time of the delivery of air from the air handler to the space.

Implementations of the invention may include one or more of the following features. The tracking of the amount of time that air has been delivered includes tracking the on time of a circulating fan that delivers the air. The controlling of the turn-on time or turn-off time is also based on an intended amount of time that air has been delivered from an air handler to a space. The intended amount of time includes a minimum amount of time. The intended amount of time is specified by a user. A vent that delivers replacement air to the air handler is also controlled to open or close by a selectable amount to achieve a particular flow rate of replacement air. The particular flow rate is derived from at least one user specified value. The user specified value includes an intended average flow rate.

In general, in another aspect, the invention features, based on information about an intended flow rate of replacement air to an air handler and an intended amount of time that air is to be delivered from the air handler to the space, performing a calculation to determine a flow rate of replacement air to an air handler to be achieved during periods when a vent that controls the delivery of replacement air is open.

Implementations of the invention may include one or more of the following features. The information about an intended flow rate of replacement air includes a value indicating an average volume of air per time period. The value is specified by a user. The information about an intended amount of time is specified by a user. The calculation includes dividing the intended flow rate by the amount of time. The calculation is also based on information about a duration of a duty cycle of a fan that delivers the replacement air to the space.

In general, in another aspect, the invention features enabling a user of a controller associated with an air handler to enter a value of an amount of replacement air to be delivered to a space. In some implementations, the amount of the replacement air is expressed as an average volume per time.

In general, in another aspect, the invention features enabling a user of a controller associated with an air handler to enter a value of a minimum amount of time that a fan of the air handler is to run. In some implementations, the user is enabled to enter a value of a duty cycle of the fan.

In general, in another aspect, the invention features enabling a user of a controller associated with an air handler to enter a value of an amount of replacement air to be delivered to a space, a value of a minimum amount of time that a fan of the air handler is to run, and a value of a duty cycle of the fan.

In general, in another aspect, the invention features enabling a user of a controller associated with an air handler to enter an indication of a temporary change in an amount of replacement air to be delivered from an air handler to a space.

Implementations of the invention may include one or more of the following features. The user is enabled to enter an indication of the duration of the temporary change. The temporary change includes an increase associated with an increase in anticipated occupancy of the space. The temporary change includes a decrease associated with a decrease in anticipated occupancy of the space.

In general, in another aspect, the invention features sensing flow of replacement air through a vent to an air handler, opening and closing the vent to regulate delivery of replacement air to the air handler to achieve an intended rate of flow, and based on the sensed flow, determining a clogging state of the filter.

Implementations of the invention may include one or more of the following features. The clogging state includes the filter being clogged. The clogging state includes the filter being new. Flow of replacement air is sensed by sensing a change in the flow over time. Determining of the clogging state includes comparing the sensed flow to a threshold value of flow. The threshold value of flow is set empirically. The threshold value of flow is set based on the history of the sensed flow. The sensing of flow of replacement air is done by measuring a rate of rotation of a fan drive by the flow, or by measuring pressure of the air, or by measuring a velocity of the air. The vent includes a replacement air vent or a return air duct.

In general, in another aspect, the invention features issuing a vent signal to open a vent that regulates delivery of replacement air to an air handler, and in connection with the issuing of the vent signal, issuing a fan signal to turn on a circulating fan of the air handler. In some implementations of the invention the fan signal turns on the fan independently of a thermostat that controls the air handler; in some implementations the fan is turned on using a relay.

In general, in another aspect, the invention features an apparatus including a conduit containing a sensor to measure flow of air in the conduit, an air flow regulator to control flow of the air in the conduit, a coupling to couple the conduit to a fresh air intake of the air handler, and a controller to control the air flow regulator based on the measured air flow.

Implementations of the invention may include one or more of the following features. The sensor is in the conduit or not in the conduit. The air flow regulator includes a damper. The sensor includes a fan. The conduit includes a fresh air vent. The conduit includes a return air duct.

In general, in another aspect, the invention features an apparatus including, as an assembly, a controllable damper to regulate flow of air through an air flow passage between an exterior of a building and an air handler, a sensor to sense air flow through the passage, and terminals to connect the sensor and the controllable damper in a control circuit.

Implementations of the invention may include one or more of the following features. The sensor includes a contactless sensor. The sensor includes magnetic elements. The sensor includes a fan in the passage to rotate in response to air flowing through the passage. The rotation of the fan is sensed as an indicator of the volume per unit time of air flowing through the passage. The fan includes blades, at least one of the blades bears a magnet, and the sensor senses motion of the magnet. The damper is controllable to be open or closed. The damper is also controllable to be open to a selected position among at least two different open positions. The damper is controllable to be open to a selected position with a range of positions. The damper includes a rotating flap driven by an electric motor. The fan is free-wheeling. The control circuit controls opening and closing of the damper in response to sensed air flow through the passage. A filter filters air flowing through the passage. A housing defines at least a portion of the air flow passage and includes ends to mount the housing between an exterior of a building and an air handler. The housing also supports the damper, the sensor, and the terminals. The housing also supports a filter. The filter is mounted on a second structure that mates with the housing. The housing also supports at least a portion of the control circuit. The controller includes a circuit that receives signals from the sensor and sends signals to the controllable damper. The control circuit includes a terminal to connect to a thermostat. The control circuit includes an input to receive an indication from a user of how much air is to be permitted to flow through the passage. The control circuit includes logic to control the damper to allow a predetermined volume per unit time to flow in the passage.

In general, in another aspect, the invention features an apparatus including a controllable damper to regulate flow of air through an air flow passage between an exterior of a building and an air handler, a sensor to sense air flow through the passage, a control circuit to receive signals from the sensor and to send signals to cause the controllable damper to allow a predetermined volume per unit time to flow in the passage, and a housing that supports the damper and the sensor and includes features to mount the housing between an exterior of a building and an air handler.

In other aspects, the invention features media bearing instructions to cause a machine to perform such techniques and apparatus to perform such techniques.

Other advantages and features will become apparent from the following description and from the claims.

DESCRIPTION

Figure 11A:
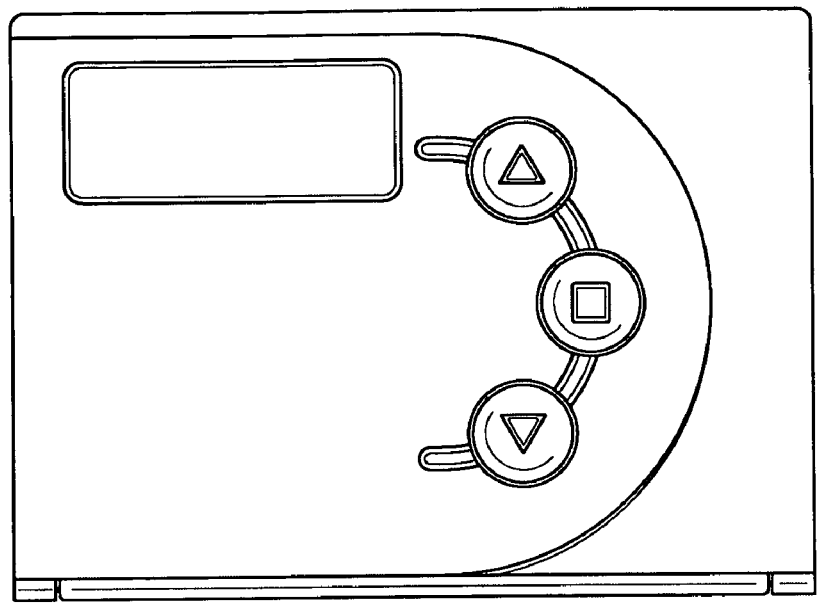
Figure 11B:
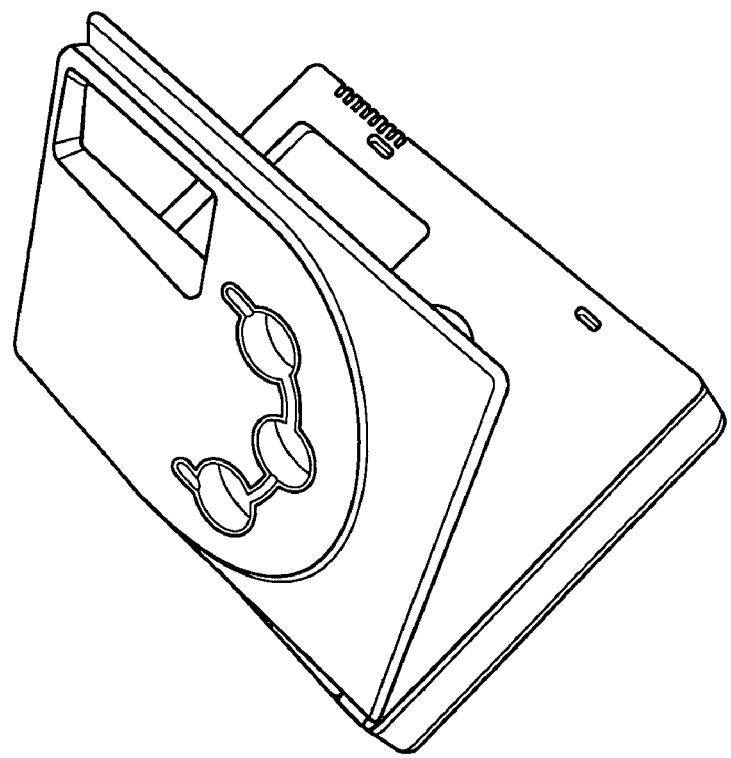
Figure 11C:
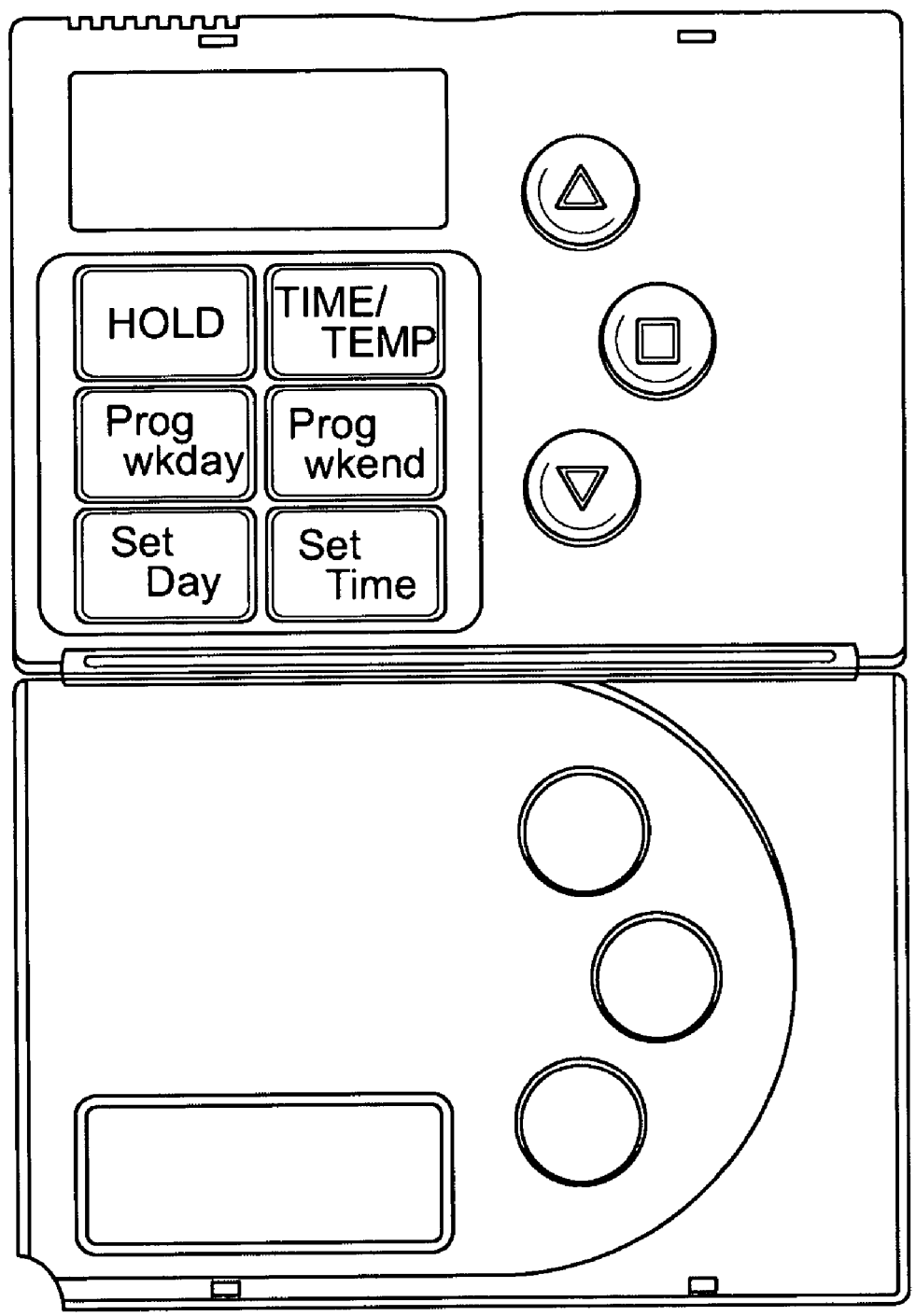

FIGS. 11A, 11B, and 11C are views of a controller.

FIGS. 12 through 15 are time lines.

Figure 16:
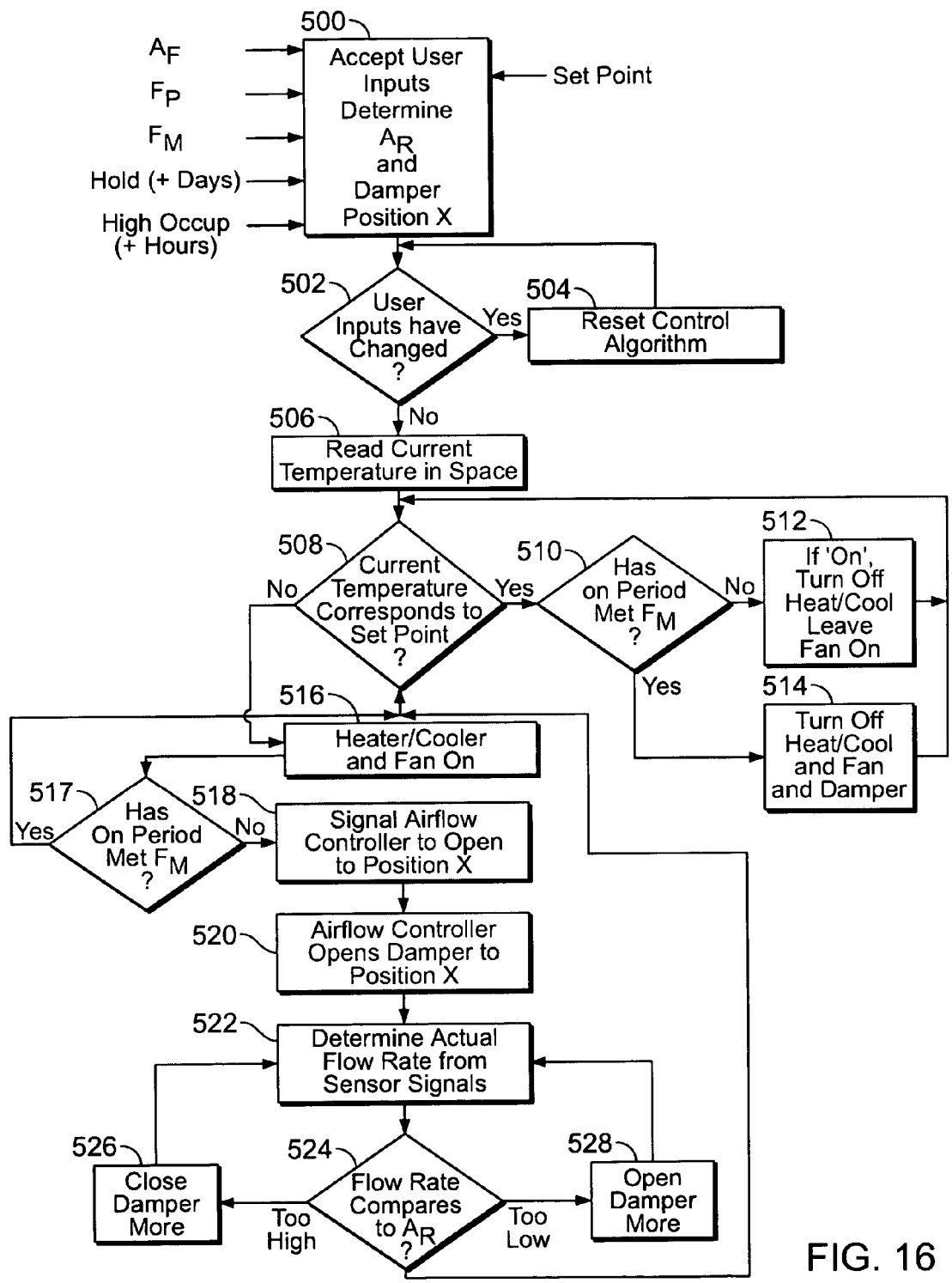

FIG. 16 is a flowchart.

Figure 1:
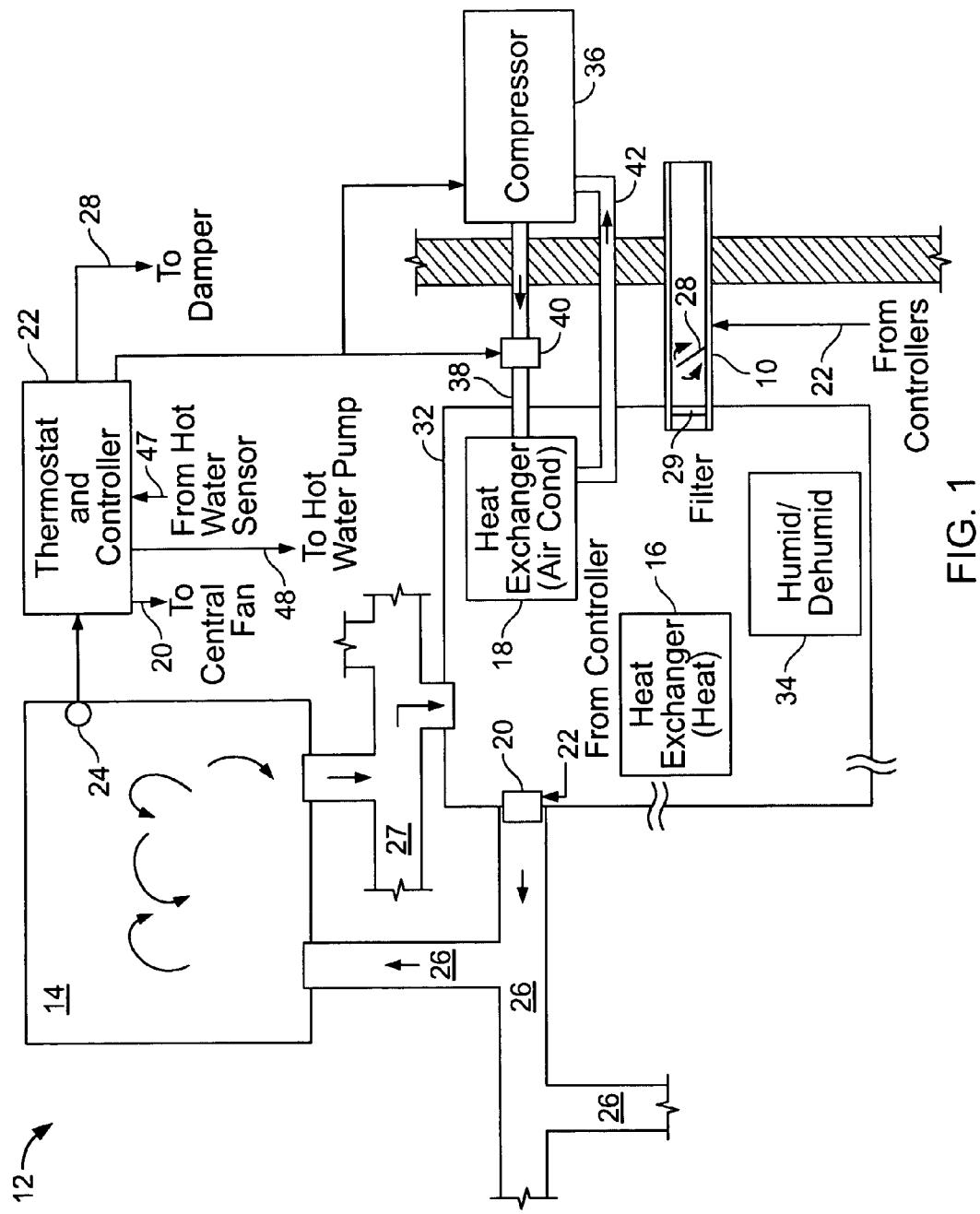
FIG. 1 is a schematic diagram of a space heating and cooling system.
Figure 2:
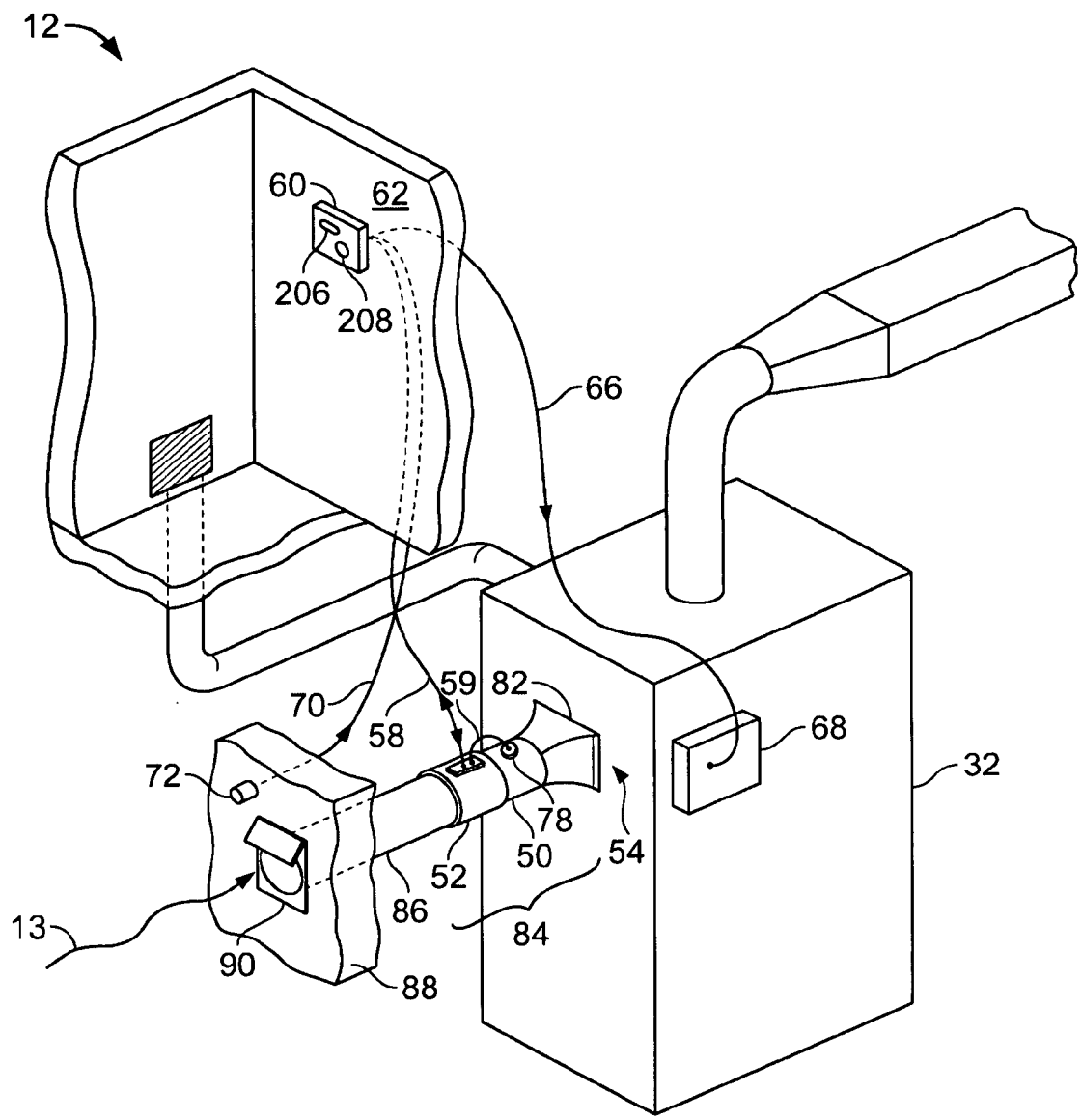
FIG. 2 is a three-dimensional view of portions of a heating and cooling system.

As shown in FIG. 2, an airflow sensing unit 52 can be placed in the flow path of outside air 13 (or other source of replacement air) that is passing from the outside environment 12 to an intake port 54 of the air handler 32 from an outside air vent 90. (We use the phrase air handler in a very broad sense to include any kind of equipment that processes air for the purpose of providing, for example, heating, cooling, or ventilation in a space.) The air flow sensing unit 52 includes an air flow sensor (hidden in FIG. 2) that produces a stream of signals from which the volume of air that passes along the air path per unit of time (e.g., 20 cubic feet per minute, CFM) may be derived.

The derivation of the CFM can be done, in one example, by a processor in a local electronic circuit 56 (which we sometimes call an airflow controller) that is mounted on the sensing unit 52 or, in another example, can be sent by a cable 58 to a thermostat and controller 60 (which we sometimes call simply a controller or a main controller) mounted on a wall 62 of a space of a building.

The main controller 60 contains a thermostat circuit that compares data indicative of the temperature in the space with a desired set point temperature. In some implementations, the controller itself may not contain a temperature sensor but may be connected as a controller to an existing thermostat and in that role monitors the existing thermostat. The controller 60 sends control signals on a cable 66 to a set of drivers 68 on the air handler to control heating and cooling to drive the temperature in the space to reach the set point and to control central fan operation during heating and cooling and at other times. The controller 60 may also receive data on a cable 70 from an outside sensor 72 that senses one or both of the relative humidity and temperature of the outside air and may use the data as part of an algorithm that determines when to call for heating or cooling.

(For example, if the controller determines that the outside temperature is cooler than the inside temperature at a time when cooling is being requested, the controller could open the damper fully and turn on the central fan for a period to attempt to cool the space with outside air without using the cooling feature of the air handler. The converse determination could be made for heating when the outside temperature is warmer than the inside temperature.

If the outside relative humidity is high during a call for cooling, the controller could allow the space to be cooled a small amount lower than the set point to allow long cooling runs to dry out the inside air. Short cycling the air handler for cooling tends not to remove much water from the air, which can occur if a system is over-sized. In another use, if the outside air temperature is close to the inside air temperature, which could result in relatively little fresh air being provided to the space, the damper may be open fully or for a longer period to increase the fresh air delivered.

These control features could also be based on signals from an inside relative humidity sensor.

In another application, when the weather is cold and dry outside, and the inside relative humidity is elevated, the controller may open the damper more fully or for a longer period to reduce the inside relative humidity.

The main controller 60 also is configured to send damper control signals to control a motor 78 that is mounted on a damper 50 and can drive the damper to any position between full closed and full open (the full open position may be, e.g., 90 degrees from its closed position). The damper control signals may be sent on cable 58 through the airflow controller 56 to the motor driver. The controller can open and close the damper for any number, frequency, and length of time periods and by any amounts within the operating range of the damper. The main controller uses an algorithm and circuitry (discussed later) to determine the time periods and the degree of opening that will be applied for each time period.

The airflow controller drives the damper to the desired position in the following way: The damper motor may be a 1 rpm motor, for example, so that the passage of time can be used to determine position. For example, running the motor for 15 seconds puts the damper full open at 90 degrees. The motor can be indefinitely stalled without damage, so each time the damper is to be closed fully it is run longer than necessary and stalls in the full closed position, which effectively resets it to a known position. Because the motor is run on alternating current, which is closely regulated by the power company, and because the clock speed of the microprocessor is relatively accurate, position can be determined accurately based on time.

The damper 50 and the air flow sensing unit 52 have cylindrical outer walls and are arranged in line together with a flange 82 to form a vent insert 84. The vent insert can be installed in line with and between a standard vent pipe 86 and the rectangular intake port of the air handler. The other end of vent pipe 86 passes through a wall 88 of the building and connects to the outside vent cover 90.

Figure 3:
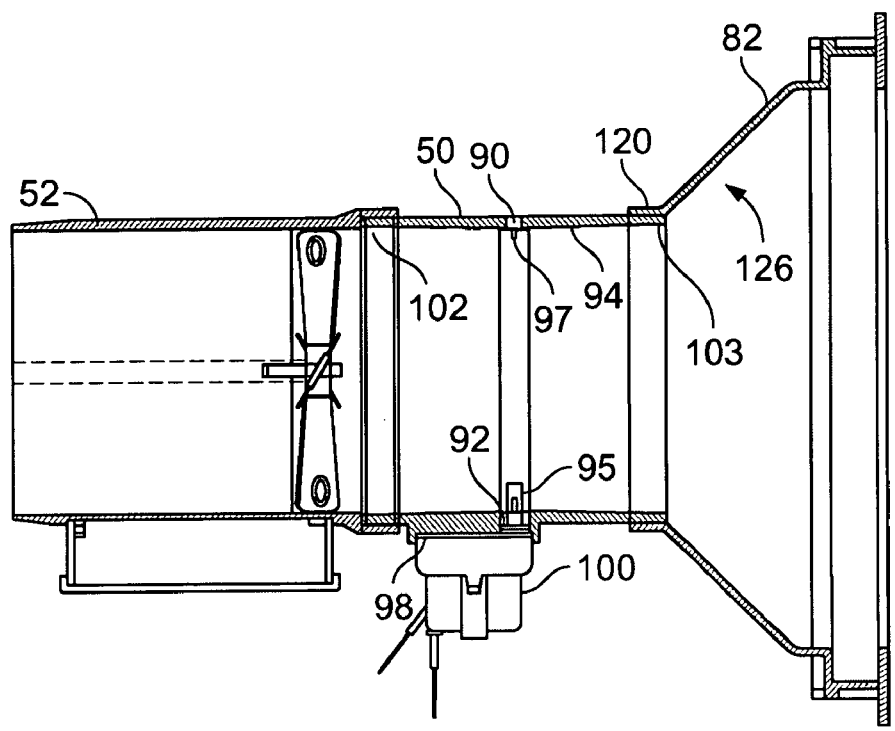
FIGS. 3 and 9 are a sectional side view and a top view of an assembly.
Figure 4:
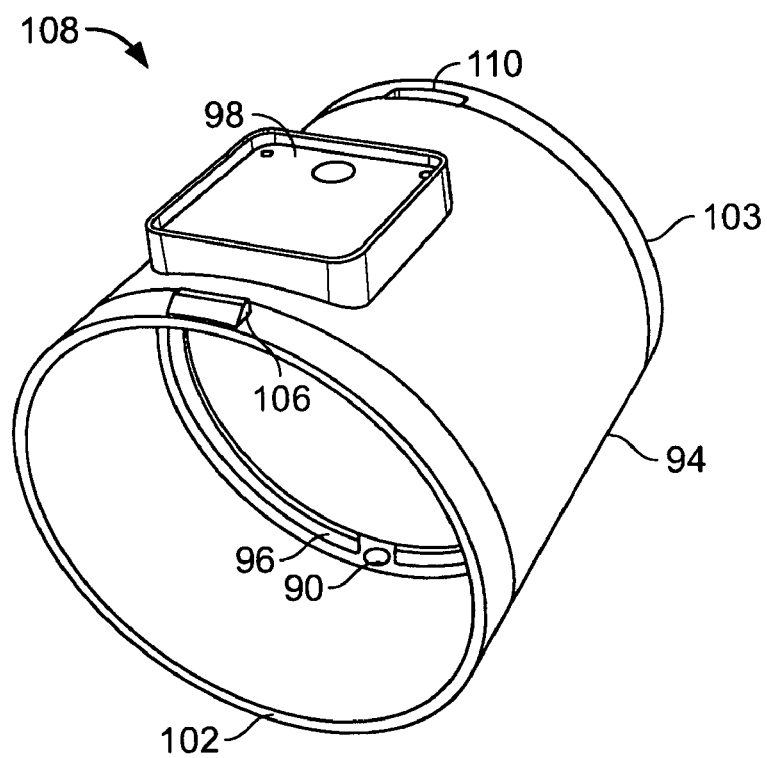
FIGS. 4 and 5 are perspective views of parts of a damper.
Figure 5:
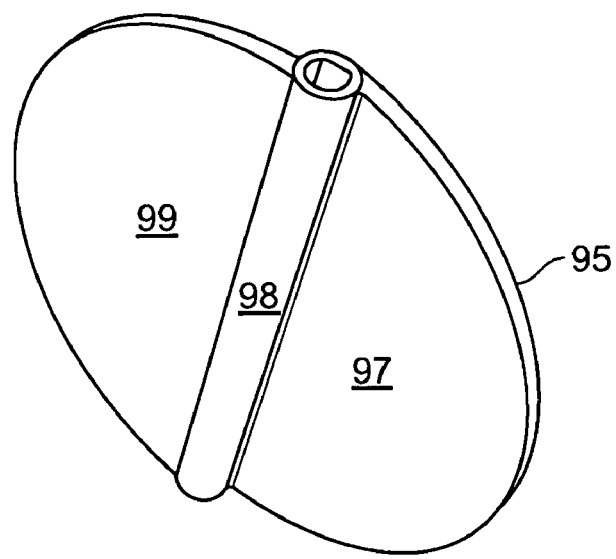

As shown in FIGS. 3, 4, and 5, the damper 50 includes a molded cylindrical body 94 and a molded flat round vane 95. Approximately halfway along the inner wall of the body 94 is a circular rim 96 that projects into the space within the cylindrical body to define a closed position at which the damper is stopped as it is rotated to the closed position.

On the outer wall of the body 94, a flat surface 98 is defined to support an electric stepper motor and gear assembly 100 used to drive the damper to selected positions based on signals sent from the controller.

At two diametrically opposite positions around the rim 96 are two holes 90, 92. The vane 95 (which is not shown in FIGS. 3 and 4) has two slightly offset (along an axis normal to the vane) semicircular plates 97, 99, joined at a central tube 91. The damper is held in place in the body 94 by two pins 93, 97 (FIG. 3), one that projects from hole 90 into one end of the central tube. One end of the other pin is connected to a shaft of the motor and gear assembly 100. The other end of that pin projects into the other end of the central tube 91 and is keyed into that hole so that rotation of the motor causes rotation of the damper.

The circular end 102 of the body of the damper 50 that connects to the sensor unit has projecting fingers 106, 108 that mate with and lock into corresponding holes 109, 111 (FIG. 6) in a body of the sensor unit. The other end 103 of the body of the damper 50, which connects to the flange 82, has two holes 110, 112 to receive projecting fingers similar to the fingers 106, 108.

Figure 7:
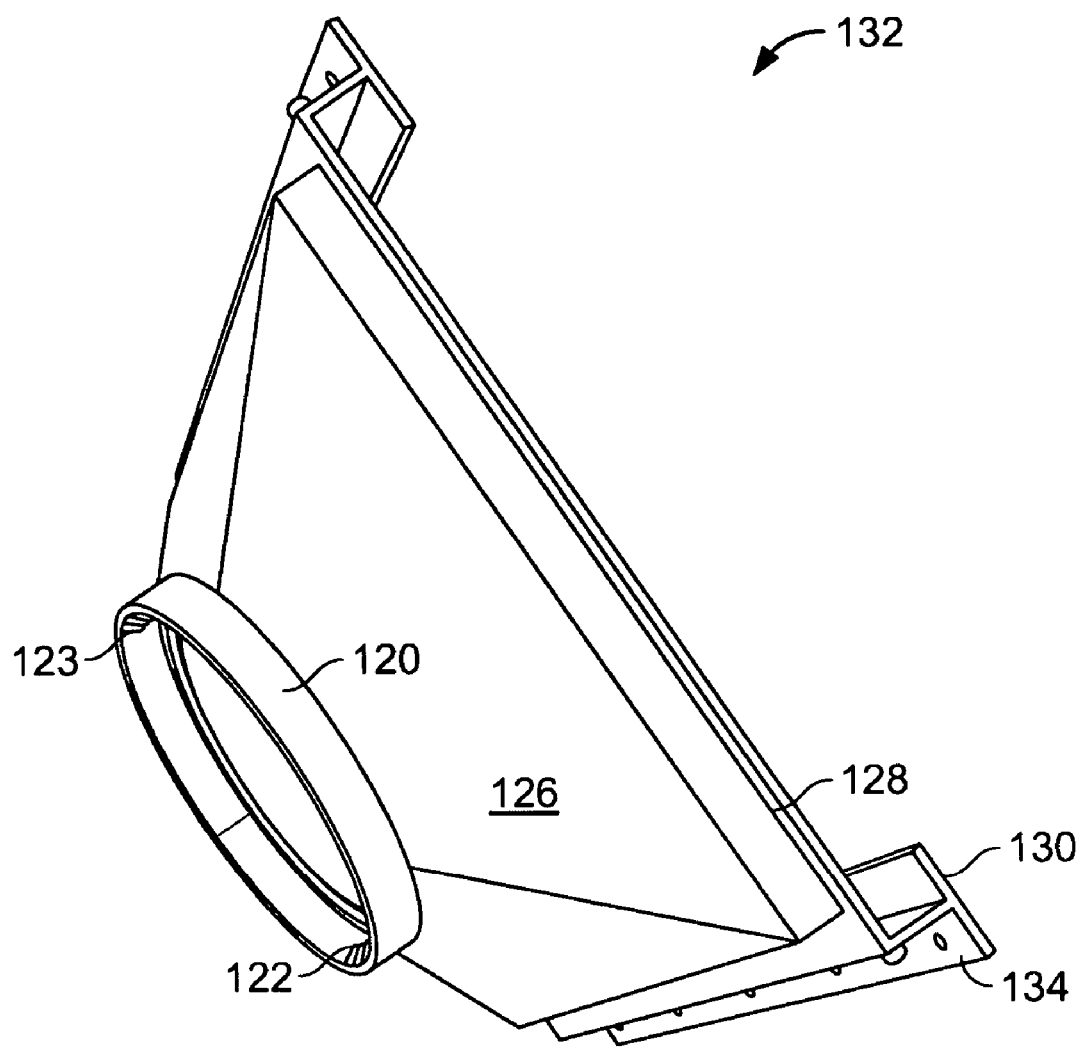
FIG. 7 is a perspective view of a flange/filter housing.

Referring to FIG. 7, the flange 82 has a round end 120 having an inside diameter that is slightly larger than the outside diameter of the end of the damper with which it mates. Two fingers 122, 123 project into the space defined by the round end 120 and mate with the holes 110, 112 of the damper. All of the fingers 106, 108, 122, 123 have tapered leading edges to permit then to be easily forced into the mating holes and have blunt trailing edges to make them hard to remove from the mating holes except by inserting a tool through the holes and against the fingers to force them out of the holes.

The flange 82 includes a square cross-section tapered wall 126 that tapers from the round end 120 to a square cross-section to the opposite square end 128 of the flange. The square end is defined by a rail 130 that is formed along three sides of the square end. The fourth side 132 has no rail.

The rail 130 includes a mounting lip 134, 135 having a row of screw holes for use in mounting the flange to the sheet metal wall of the air handler. The three sides of the rail define a square pocket at the square end of the flange that is larger than the inlet port of the air handler and is deep enough to receive an air filter (not shown), e.g., a standard square air filter or a custom one.

Figure 6:
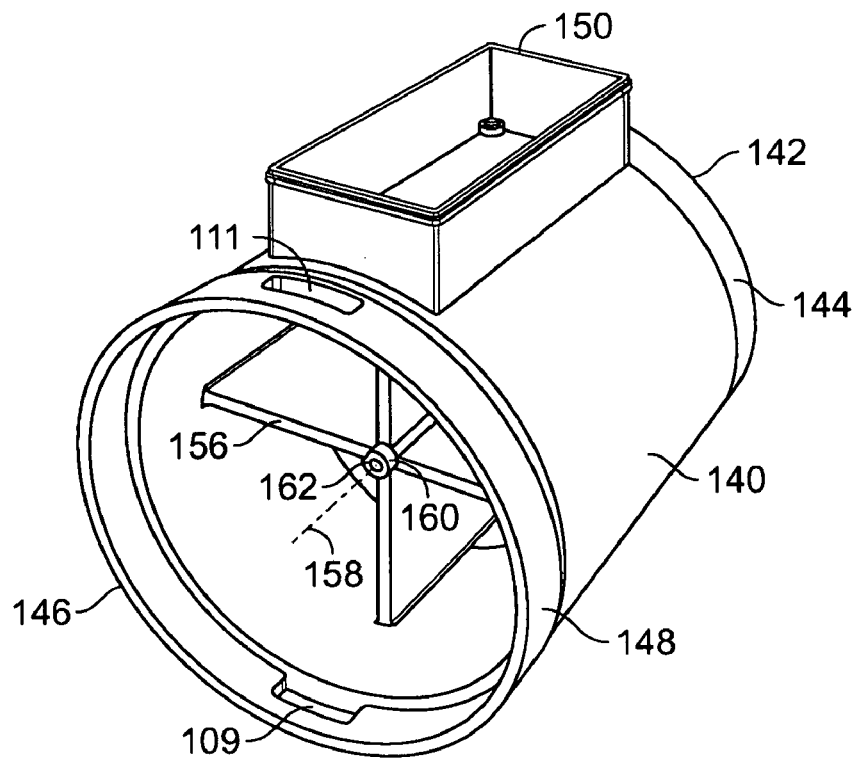
FIGS. 6 and 8 are perspective views of parts of an airflow sensor.

As shown in FIG. 6, the airflow sensing unit 52 has a molded cylindrical body 140. One end 142 of the body has a tapered section 144 to enable the unit to be inserted and held within the inner diameter of the vent pipe 86. The other end 146 of the unit has an enlarged cylindrical section 148. The inner diameter of the section 148 is large enough to receive the outer diameter of the end of the damper.

The outer wall of the body 140 supports a box 150. The electronic circuit 56 (not shown in FIG. 6), which we also call an airflow controller, is held in the box. Inside the body 140, four wings 156 (arranged at 90-degree intervals) extend from the inner wall of the body to a central axis 158. At the central axis, a ring 160 is supported on the wings. A hole 162 in the ring is sized to receive a pin that is used to mount a fan.

Figure 8:
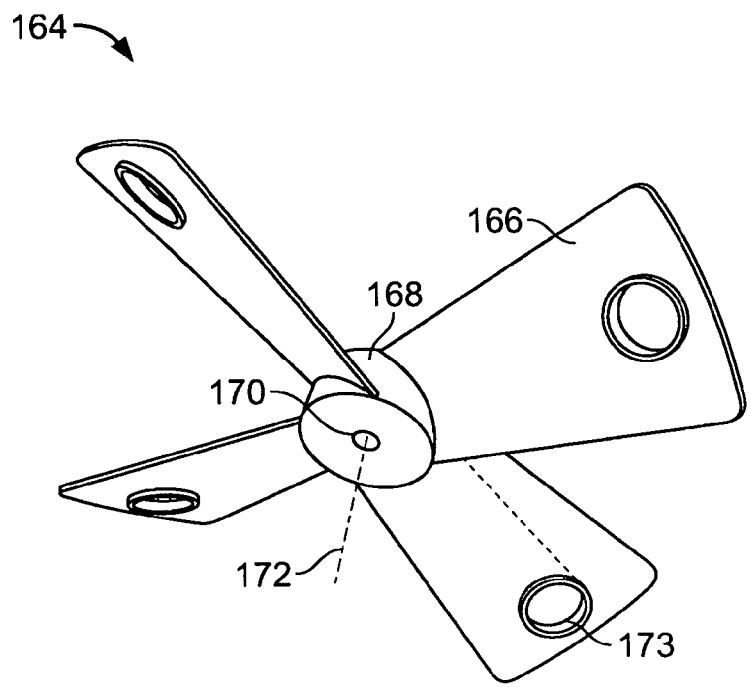

As shown in FIG. 8, the fan 164 that is mounted on the body 140 has four identical fan blades 166 evenly spaced around a hub 168 that has a mounting hole 170 and a central axis 172. The fan blades are mounted at an angle to the axis. The hub is mounted on the ring 160 (FIG. 6) using a pin (not shown) that permits the fan to rotate freely about the axis 158, 172. A magnet 173 is mounted near the outer end of each of the fan blades.

Figure 9:
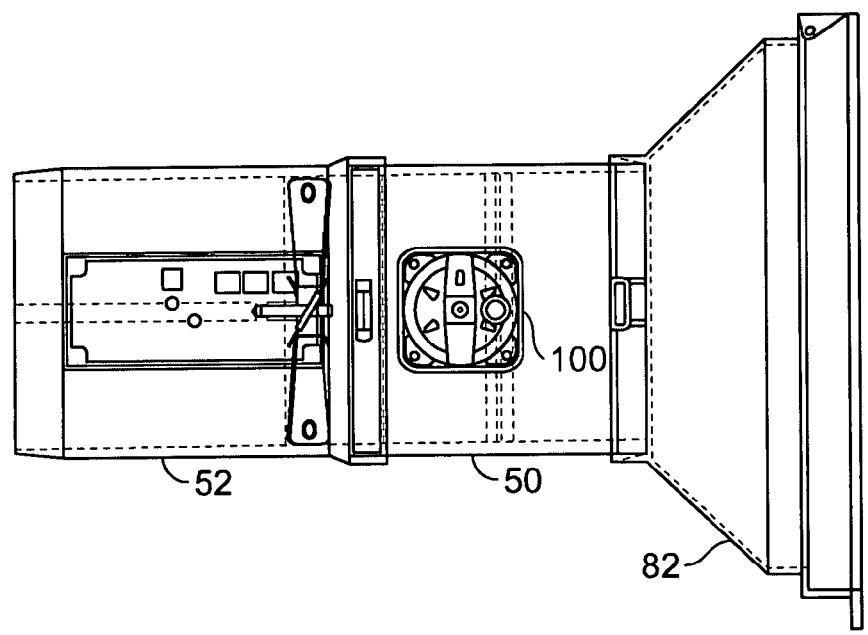

As shown in FIGS. 3 and 9, when assembled, one end 103 of the damper 94 is inserted into the round end 120 of the flange until the two fingers on the flange latch into the two holes in the damper. The other end 102 of the damper is inserted into the larger end 148 of the sensor unit 146 until the fingers on the damper snap into the corresponding holes in the sensor unit. The resulting assembly 180 is then installed in the building by screwing the flange to the air handler and inserting the free end of the sensor unit into the vent pipe. The motor 100 of the damper is connected to a source of power and the signal lines among the airflow controller and the damper are connected to the main controller. A filter is inserted into the pocket at the interface between the air handler and the flange.

Once the assembly 180 has been installed, when the damper is open and air is drawn into the air handler from the outside, the air moves through the sensor causing the fan to rotate. The fan rotates more rapidly with higher velocity of air motion. The rotation of the fan is indicative of the air flow volume per unit time. As the fan rotates, the airflow controller detects when each of the magnets on the blades passes the location of a magnetic detector that is part of the airflow controller. The airflow controller then determines the RPM (which may be the instantaneous RPM in some examples, or an averaged RPM in other examples). Based on the RPM signals, the main controller converts the RPM signals to a flow rate in CFM, for example, by using a stored look-up table that associates flow rates with rotation rates as determined empirically.

Figure 10:
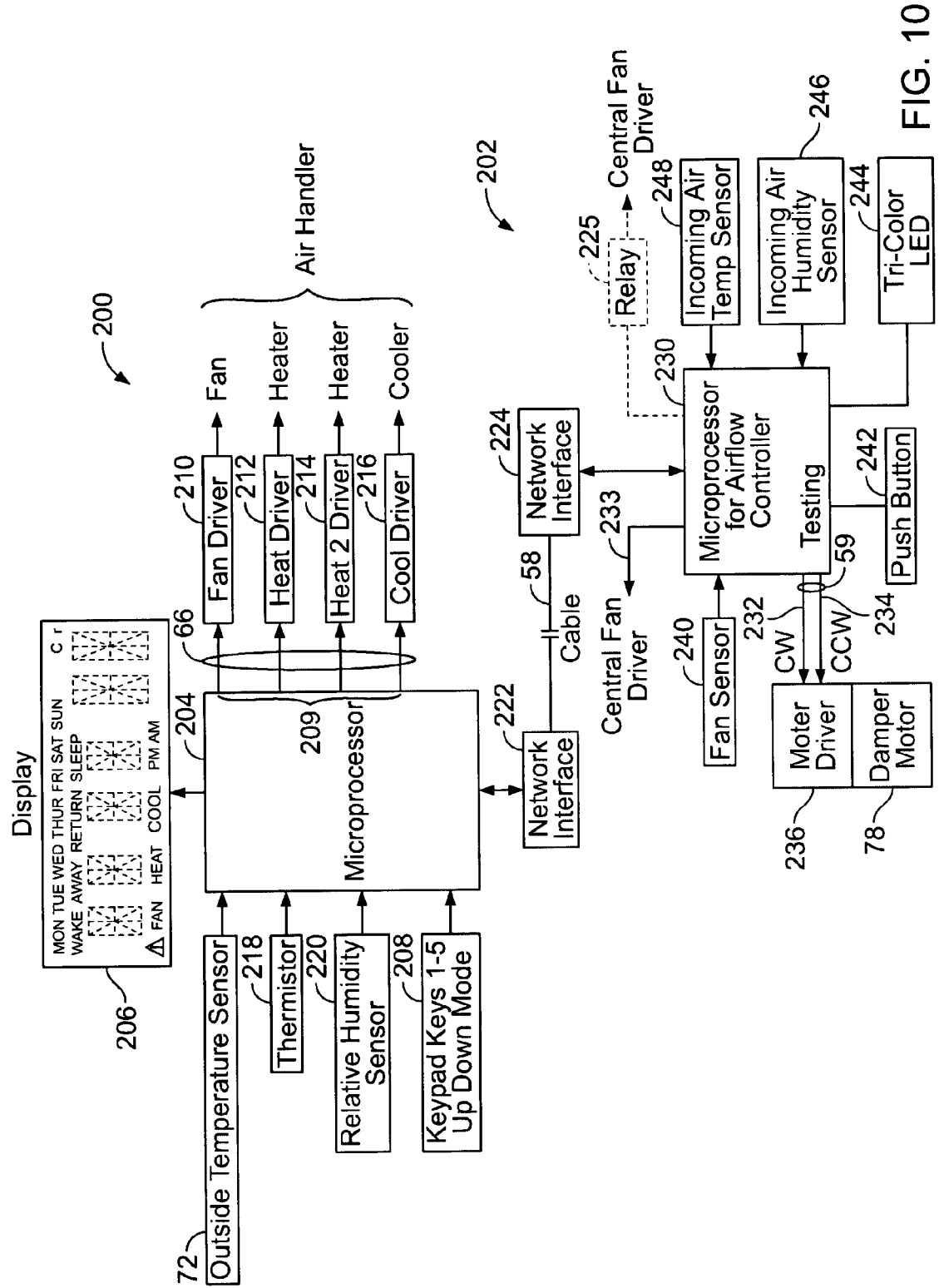
FIG. 10 is a schematic diagram of a control system.

The airflow controller circuitry 202 and the main controller circuitry 204 and their interconnections are shown in FIG. 10.

The main controller includes a microprocessor 204, a display 206 that is controlled by the microprocessor, and a keyboard 208 that enables a user to manage the operation of the main controller. In one implementation, the keypad provides eight keys (membrane switch keys 1 through 6, and up, down, and mode buttons), and the display has the configuration shown in the figure. The microprocessor includes control outputs 209 for the fan driver 210, the heat driver 212, a second heat driver 214, and a cooling driver 216. The outputs are carried on a cable 66 to the air handler where the drivers are located.

The main controller includes a thermistor 218 to detect the temperature within the space being heated or cooled. The main controller may also include a relative humidity sensor 220. Optionally, the microprocessor can also receive signals from an outside temperature sensor and an outside relative humidity sensor 72 that are mounted in a position exposed to the outside world. Data to be sent back and forth between the main controller and the airflow controller on the cable 58 is handled by a network interface 222 at the main controller end of the cable and a corresponding network interface 224 on the airflow controller end of the cable.

The airflow controller 202 includes a microprocessor 230, which receives directives about the timing and degree of opening of the damper from the main controller. The primary output control signals from the microprocessor are clockwise and counterclockwise signals 232, 234 that are delivered to the motor driver 236. In one example, the counterclockwise signals are controlled to cause the damper to move toward the fully open position. The clockwise signals are controlled to cause the damper to return toward the fully closed position. Any degree of opening between fully open and fully closed can be achieved. The airflow controller turns on the central fan whenever the damper is opened. In examples that include a thermostat in the central controller, the controller would cause the central fan to be turned on using a signal 233 produced by the airflow controller. In examples in which the central controller does not include a thermostat, a relay 225 is used to turn on the fan independently of the thermostat.

The fan sensor 240 may be a Hall effect device that detects the passage of each blade of the fan and delivers a corresponding signal to the microprocessor. The microprocessor converts the signals to an RPM value, which is then passed back to the main controller through the network interfaces.

A pushbutton 242 may be used to test the airflow controller, and a tri-color LED 244 is used to indicate the state of the airflow controller. Optionally, the airflow controller can receive signals from incoming air temperature and humidity sensors 248, 246, process the signals to produce raw data, and pass the raw data back to the main controller.

The airflow controller operates as a slave to the main controller and receives and responds to commands from the main controller.

When the main controller commands the slave to open the damper to position x, the airflow controller causes the damper to open to the requested position, x. When the main controller commands the slave to report its status, the airflow controller reports the position of the damper, including the status indicated by its LEDs 244, the state of the push button 242, and any error codes. When the main controller commands the slave to report the fan RPM, the airflow control sends back the value of the fan RPM. When the main controller commands the slave to change the LED's state, the airflow controller replies with an acknowledgement.

FIGS. 11A, 11B, and 11C show a front view with cover closed, a perspective view, and a front view with cover open of the external housing of the main controller. In addition to controlling the fan on periods and the damper open periods, the controller serves as a conventional programmable thermostat. For this purpose it provides keys to program a weekday set point schedule and a weekend set point schedule, and keys to set the day and time. A fifth key controls the set point and a hold key sets the hold function. The two buttons that have up and down arrows are used to increase or decrease a value and the square button serves a similar role to an enter button on a keyboard.

The mode and up and down buttons are used to set Af, Fp, and Fm values (described later). The controller includes a main housing and a base that is attached to the wall. The main housing snaps onto the base. By holding the up button in while snapping the housing to the base, the microprocessor is alerted to enter setup mode. Once in setup mode the display indicates the value that is being set. Pressing the mode button cycles through the three variables that are to be set. When a given variable is in set mode, the up and down arrows control the value of the setting. Other arrangements could be used to invoke the setup mode, for example, pressing a combination of the membrane switches at one time. In some implementations, a separate device may be provided to read out data from the controller and the device may also be able to lock and unlock the settings or to re-program the settings and then lock the settings so that the user is precluded from changing them.

The hold button controls both the hold options and the high occupancy options. The hold options could include setting a number of days for holding, or setting to hold indefinitely. The high occupancy option would hold the setting for a specified number of hours.

To operate the system, the user may use the keypad and the display of the controller to enter several values to be used by the control algorithm. One value is an average desired fresh air flow rate into the space being heated or cooled, called Af and expressed in cubic feet per minute. The user can determine what this value should be by using simple recommendations of another party or by doing a calculation on a website based on the characteristics of the house, and its occupancy. ASHRAE, for example, specifies 15 CFM per person. Or 15 CFM per bedroom+one. For example, the user may set the value of Af to 30 CFM indicating a desire to have an average 30 CFM of fresh air delivered to the space. A second value is the controller duty cycle called Fp and expressed in minutes, which represents the durations of the successive periods over which the algorithm will be applied. A third value is a fan minimum run time, called Fm and expressed in minutes, which represents the minimum number of minutes that the fan should run during each controller duty cycle.

The controller uses the entered values to calculate a required flow rate, called Ar and expressed in cubic feet per minute, which will apply during the periods when the fan is running and the damper is open. Ar is calculated as (Fp/Fm)Af=Ar. For example, if Af=30, Fp=10, and Fm=30, then Ar=90 CFM which is the flow that must be achieved during the periods when the damper is open.

The user can use the controller keypad to override the normal operation of the algorithm by specifying a hold mode or a high occupancy mode.

The hold mode could be applied, for example, during a vacation period when the space will not be occupied. When the user presses the hold button, the controller prompts the user to enter a number of days to hold. The controller then holds the temperature constant at the then current set point and disables setback scheduling for the specified number of days or indefinitely (depending on the setting option that is used. The fresh air flow rate Af is reduced to a pre-set minimum flow rate, for example, 90 CFM. The fan minimum run time Fm is reduced to a pre-set time, for example, 10 minutes.

Another variant of the hold mode could be used in situations in which outside ventilation is being obtained, say, from an opened window in a context in which the thermostat is not calling for either heating or cooling. In such a circumstance, when the user enters the hold mode, he could be given an option to completely disable fan operation and fresh air input, for example, until further input from the user.

The high occupancy mode may be used, for example, when a larger than normal number of people will occupy the space, requiring a higher than normal fresh air flow rate. When the user presses the high-occupancy button, the controller prompts for a number of hours to maintain the high occupancy mode. During the period when the mode is maintained, the temperature is held at the current set point, and setback scheduling may be disabled. The fresh air flow rate Af is increased to a pre-set maximum flow rate, for example 90 CFM. The fan minimum run time, Fr, is increased to a pre-set run time, for example, 10 minutes. During high occupancy mode, if the set point temperature cannot be maintained, then the fresh air flow rate Af will be decreased until the set point temperature is reached. Reducing the fresh air flow rate in this way will enable the heater or cooler to adjust the temperature to the set point.

As shown in FIG. 12, in some control systems a user can indicate the percentage of time (for example, 33%) that he would like the central fan of the air handler to run—whether or not the thermostat is calling for heating or cooling—in order to keep air circulating in the space. Such systems track off time as a control technique. Note that the fan is always on when the thermostat is calling for heating or cooling. During periods when the thermostat is not calling for heating or cooling, the system monitors the amount of off time. If the amount of off time exceeds the desired percentage, then the fan is turned on.

For example, as shown in the figure, the user may specify that the central fan should run 33% of each 30-minute period. Suppose that the thermostat makes no call for heating or cooling at any time during the 30-minute period. Time line 402, in the upper half of the figure, shows the on and off periods of the fan during. For the first 30 minutes, the thermostat is not calling for heating or cooling and the central fan is on 404 for the first 10 minutes, then off 406 for 20 minutes in order to meet the desired percentage of on time. The same pattern is repeated in the second 30 minutes. In this example, the desired proportion of fan on time, 33%, is accurately achieved.

By contrast, in the time line 408, shown in the bottom half of FIG. 12, the desired proportion of fan on time is not met. In this example, the thermostat calls for cooling for 4 minutes 410, followed by an interval 412 of 16 minutes of no cooling, and then the pattern repeats. During the first 4 minute cooling period, the fan runs. When the cooling ends, the fan is turned off. If no cooling were then required for more than 20 minutes, the fan would be turned on by the algorithm, which watches the amount of off time to assure that the fan is never off for a period longer than 20 minutes. However, in the example, a new cooling period is triggered after only 16 minutes causing the fan to go on, so the algorithm never determines that the fan has been off longer than 20 minutes. The same sequence then repeats. As a result, the fan is only on for 12 minutes an hour, instead of the desired 20 minutes per hour, an error of 40% that results in the air in the space being less fresh than desired.

Referring to FIG. 13, in a different approach, it is the on time of the fan that is tracked and the algorithm assures that a minimum desired on time per controller cycle is met. For example, the user may select a fan minimum on time of 10 minutes in each 30-minute period, the same target as in the example of FIG. 12. Suppose that, as in the lower half of FIG. 12, the thermostat calls for cooling for 4 minutes at the beginning of every successive 20-minute period. In the time-line 420, the fan runs during the initial 4-minute cooling period 422. At the end of that period, when the fan is turned off, the controller (which is tracking the on time to see if it meets the desired value) determines that, to satisfy the desired 10 minutes of fan on time for the first 30 minutes will require that the fan be operated another 6 minutes no later than at the last portion of the 30-minute period. At the end of the second 4-minute period 424, the controller determines that 8 minutes of the needed 10 minutes of fan on time have occurred, with two minutes remaining. At the end of an additional 4 minutes of off time 426, only 2 minutes remain in the half-hour period, so the controller turns on the fan for a 2-minute period 428 to meet the goal. Next the remaining 10 minutes of the 16-minute off period 430 occurs, and the fan remains off during that period. After the next four-minute off period 432, the controller determines that 6 more minutes of fan on time are required in that half hour. So the controller allows the fan to remain off for another 10-minute period 434 and then turns it on for the final 6-minute period 436 of the second half-hour. The fan on time then exactly matches the desired on time of 20 minutes for the hour.

If, near the end of the system cycle (30 minutes in the above example), the time remaining for the fan to be run is small, say less than 3 minutes, the algorithm could decide not to run the fan, or to defer the needed time to the next cycle. This may reduce complaints by users that would otherwise be generated when they hear the fan run for short periods of time.

Thus the controller is able to achieve the desired fan on time with no excess (which wastes power and may take in too much air) and no shortfall (which may leave the air in the space stale).

Figure 14:
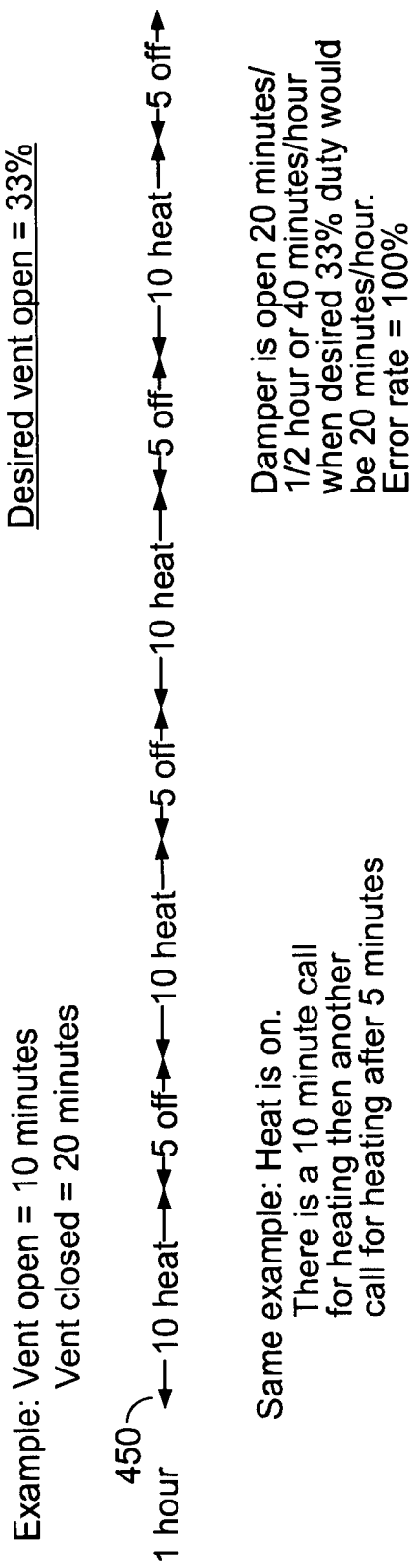

FIGS. 12 and 13 are focused on the timing of fan on and off periods. We now consider how the damper may be controlled to assure that a desired amount of fresh air is provided to the space. FIG. 14 illustrates that some known systems for controlling the open or closed state of the damper (vent) do not accurately meet the desired proportion of open time. As shown in the example, in such systems the user can specify the proportion of time that the vent is open, say, 33%, which corresponds to 10 minutes open and 20 minutes closed per half hour.

Suppose that, in the example, the thermostat is calling for heat for 10 minutes at the beginning of each successive 15-minute period. In the known system, the vent is open when and only when the fan is operating. Because the operation of the fan to serve the heating need is more than enough tot meet the desired 10 minute per half hour vent open time, the time line 450 represents the periods when heat is and is not being called for, and implicitly when the fan is running and not running and the damper is open and not open. In the example, the total fan on time and hence the total damper open time is 40 minutes during the hour, or 66% of the time, which is an error of 100% in the desired proportion of damper open time. Because the damper is open more time than is needed, energy will be wasted.

Figure 15:
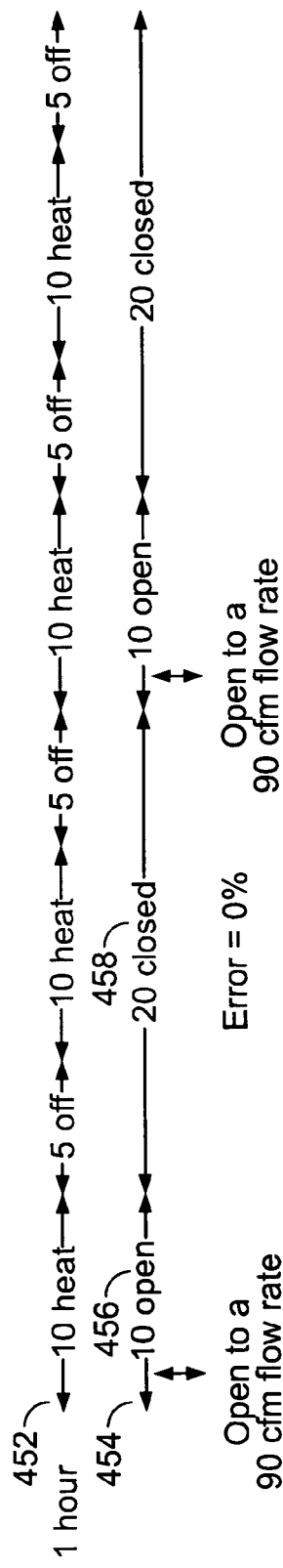

In a different control approach, illustrated in FIG. 15, the user specifically sets the fresh air rate Af at, say, 30 CFM, the minimum fan run time Fm at 10 minutes, and the duty cycle Fr at 30 minutes. The controller uses these settings to calculate a required flow rate of 90 CFM to be achieved for 10 minutes in every 30-minute period. The upper time line 452 in FIG. 15 shows, as did the time line in FIG. 14, the periods when the heat is and is not being called for. The lower time line 454 in FIG. 15 shows the periods when the damper is open and closed. In the initial 10-minute period 456, when the fan is running, the damper is opened enough to achieve a 90 CFM flow rate, as determined by the controller. In the next, 20-minute period 458, running to the end of the half-hour, the damper is closed because the controller has determined that the quota of damper open time for that half hour has been met. The periods are then repeated in the second half hour. Unlike the system shown in FIG. 14 (which does not allow the user to specify flow rates), the desired flow rate/time schedule is met exactly in FIG. 15.

Portions of the algorithm used for the main controller and the airflow controller are shown in FIG. 16.

At block 500, the controller accepts inputs from the user that may include Af, Fp, Fm, Hold, High Occupancy, and a set point. If the user inputs have changed any of those values, 500, the system resets the control algorithm accordingly 504. Otherwise the controller reads the current temperature setting from the sensor in the space 506. If the current temperature corresponds to the current set point, 508, the controller determines whether the on period of the fan has met the value Fm. If not, the controller turns off the heater or cooler (if it was already on) and leaves the fan on. If so, the controller turns of the heater or cooler (if it was already on) and turns of the fan and closes the damper. Then the controller returns to check the temperature against the set point again.

If the temperature does not correspond to the set point, the controller turns on the heater or cooler 516 and tests whether the on period of the fan has met Fm. If so, the controller returns to check the temperature against the set point again. If not, the controller signals the airflow controller 518 to open the damper to position x. The airflow controller opens the damper to position x 520 and then determines the actual flow rate using the sensor signals 522. Next the airflow controller compares the flow rate to Ar. If the flow rate is too low, the airflow controller opens the damper by an increment 528; if too high, the airflow controller closes the damper by the increment 526. If the damper is already fully open or fully shut, an error can be signaled by the main controller. If a fully open damper does not provide enough total air flow in some cases the controller could increase Fm. Or the controller can signal an error and ask the user to check the filters. If neither too low nor too high, the airflow controller so indicates to the main controller which then again tests the temperature against the set point.

The requirement for minimum airflow in a space could be one set by an industry standards group, for example, ASHRAE, or could be one set by a user or by a manufacturer of air handlers or by a builder of the house or other structure. For example, the builder may know the building leaks more than intended so that less than the recommended amount of fresh air needs to be provided to the space. Or even tighter building techniques could produce a need for higher than previously recommended fresh air replacement rates Conversely it could be yet a new building method where the home was tighter.

By monitoring the airflow and/or the damper position over time in a given system, it is also possible to determine when the filter needs to be cleaned or replaced. Decreases in the airflow rate will indicate blockage of airflow. When the airflow falls below a predetermined value, an indicator can tell a user that it is time for filter maintenance. The predetermined value may be set empirically for systems in general, or for each installed system in particular. Empirical analysis may not be required, because filter maintenance time may also be inferred from the profile of declining airflow. For example, the algorithm could watch for an abrupt change in airflow as an indicator that a filter situated upstream of the central fan is clogged. In that circumstance, the damper would be held open all the time and yet not be delivering the needed fresh air.

If the filter is on the downstream side of the central fan, as the filter clogs more air will be drawn from the outside, increasing air flow and drawing in more air than is appropriate to mix with the recirculated air. In the latter case, when the filter clogs, the pressure in the air handler drops and the flow from the outside world increases. The algorithm would detect these events and trigger an indicator that the filter should be replaced or cleaned.

When a new filter is installed, the algorithm could determine that fact automatically by watching for a prolonged abrupt decrease or increase in air flow that lasts at least, say, 10 minutes. The algorithm could then store the air flow rate for the new filter. When the air flow rate increases or decreases from the new filter rate by a change amount that is predetermined the filter maintenance alarm would be raised.

Before a filter is fully clogged and as it becomes slowly clogged from its new state, the algorithm will automatically accommodate the change in air flow. Thus the system will achieve both a longer effective filter life and simultaneously achieve a more constant and precise air flow rate.

The techniques described above may be implemented in a wide variety of machines, including hardware, software, firmware, or combinations of them. The implementations may be part of or include other devices, such as thermostats or other controllers. When microprocessors are used, they are controlled by software that is written in or compiled into or interpreted in their native language. The software may be stored or communicated in a variety of media including, for example, memory, flash memory, mass storage devices, network based communication channels, buses, or wirelessly.

Other implementations are within the scope of the following claims.

The controller may be used not only to control dampers but also turn on and off a heat recovery ventilator (which may be used to exchange heat from outgoing air with the incoming air) or an in-line boost fan (which could be used to bring more fresh air into the system in the case of long intake duct run, for example) or an exhaust fan (in a balanced ventilation system). The airflow controller may have an auxiliary output that will signal anytime the damper is open (in any position). The output may go to a relay board that can be used to turn on and off anything else that a user might want to control.

The air sensing unit, the damper, and the flange need not be interconnected as an assembly and can be mounted separately or in pairs (or as the complete assembly) anywhere along the air intake duct. The assembly can comprise any two of the three units with the third one being installed separately. The damper need not be custom made to couple to the other two units, but rather can be a commercially available motor driven damper.

The airflow sensor could be implemented in a variety of ways that include a rotating fan and in ways that do not involve a fan. Air flow could be sensed using a hot wire anemometer, for example. The sensor could be designed to measure air pressure rather than fan rotation and the algorithm could infer air flow from changes in the air pressure within the intake duct.

Other algorithms could be used to determine how to control the damper to achieve a desired profile of air flow.

Controlling of the duty cycle of the damper in the fully open and fully closed states may be a simple and economical way to achieve a desired average flow rate, and controlling of the duty cycle might be combined with controlling the amount of opening and closing of the damper to achieve a precise instantaneous air flow rate.

The invention claimed is:

1. A method comprising
tracking an aggregate amount of time that air has been transferred into or out of a space during an air transfer period, wherein said aggregate amount comprises time during which a hot or cold air generation system is on, and time during which the hot or cold air generation system is off, and
based on the tracked aggregate amount of time, controlling at least one turn-on time or one turn-off time of a fan that transfers air into or out of the space.

2. The method of claim 1 in which tracking the aggregate amount of time that air has been transferred comprises tracking the on time of a circulating fan that delivers air to said space during said air transfer period.

3. The method of claim 1 in which the controlling of the turn-on time or turn-off time is also based on an intended amount of time that air has been delivered from an air handler to a space.

4. The method of claim 3 in which the intended amount of time comprises a minimum amount of time.

5. The method of claim 3 in which the intended amount of time is specified by a user.

6. The method of claim 1 also including controlling a vent that delivers replacement air to the air handler.

7. The method of claim 1 in which the vent is controlled to open or close by a selectable amount.

8. The method of claim 7 also including controlling the vent to achieve a particular flow rate of replacement air.

9. The method of claim 8 in which the particular flow rate is derived from at least one user specified value.

10. The method of claim 9 in which the user specified value comprises an intended average flow rate.

11. A medium bearing instructions to cause a machine to
track an aggregate amount of time that air has been transferred into or out of a space an during air transfer period, wherein said aggregate amount comprises time during which a hot or cold air generation system is on, and time during which the hot or cold air generation system is off, and
based on the tracked aggregate amount of time, control at least one turn-on time or one turn-off time of a fan that transfers air into or out of the space.

12. Apparatus comprising
a controller to
track an aggregate amount of time that air has been transferred into or out of a space during an air transfer period, wherein said aggregate amount comprises time during which a hot or cold air generation system is on, and time during which the hot or cold air generation system is off, and
based on the tracked aggregate amount of time, control at least one turn-on time or one turn-off time of a fan that transfers air into or out of the space.

13. The method of claim 1 in which tracking the aggregate amount of time that air has been transferred comprises tracking the on time of an exhaust fan that removes air from said space during said air transfer period.

14. A method for controlling a fan in a building having a heating or cooling system comprising:
(a) establishing a length of a fan period and a run time amount, the run time amount being less than the length of a fan period;
(b) during a fan period:
(i) operating the fan during at least some portions of periods when the heating or cooling system is operating;
(ii) if the time when the heating or cooling system operates during the fan period is less than the run time amount, operating the fan for additional periods when the heating or cooling system is not operating, such that the fan operation time during the fan period equals the minimum run time amount.

15. The method of claim 14, wherein the fan comprises an exhaust fan.

16. The method of claim 14, wherein the fan blows heated or cooled air into a space in the building.

17. The method of claim 14, wherein the fan period and the run time amount are established by a user.

18. The method of claim 14, further comprising monitoring the amount of time that the fan is operational during the fan period.

19. The method of claim 18, further comprising monitoring, in real time, the difference between the run time amount and the amount of time that the fan is operational during the fan period, and controlling the fan based on the difference.

20. The method of claim 19, wherein monitoring said difference comprises comparing said difference to the amount of time remaining in the fan period.

21. The method of claim 20 wherein controlling the fan based on the difference comprises turning on the fan when the difference is greater than or equal to the time remaining in the fan period.

\* \* \* \* \*